(12) United States Patent
Li

(10) Patent No.: US 11,323,440 B2
(45) Date of Patent: May 3, 2022

(54) SECURE ACCESS METHOD, DEVICE, AND SYSTEM

(71) Applicant: HUAWEI TECHNOLOGIES CO., LTD., Shenzhen (CN)

(72) Inventor: Hua Li, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 184 days.

(21) Appl. No.: 16/791,714

(22) Filed: Feb. 14, 2020

(65) Prior Publication Data

US 2020/0186526 A1 Jun. 11, 2020

Related U.S. Application Data

(63) Continuation of application No. PCT/CN2018/099337, filed on Aug. 8, 2018.

(30) Foreign Application Priority Data

Aug. 16, 2017 (CN) .......................... 201710703914.8

(51) Int. Cl.
*H04W 12/06* (2021.01)
*H04L 29/06* (2006.01)
*H04W 12/08* (2021.01)

(52) U.S. Cl.
CPC ...... *H04L 63/0884* (2013.01); *H04L 63/0876* (2013.01); *H04L 63/0892* (2013.01);
(Continued)

(58) Field of Classification Search
CPC ............. H04L 63/0884; H04L 63/0876; H04L 63/0892; H04L 63/102; H04L 9/32; H04W 12/06; H04W 12/08; H04W 12/062
See application file for complete search history.

(56) References Cited

U.S. PATENT DOCUMENTS

| 2004/0168054 | A1* | 8/2004 | Halasz | .................. H04L 63/162 |
| | | | | 713/155 |
| 2008/0026724 | A1* | 1/2008 | Zhang | ................. H04W 12/082 |
| | | | | 455/411 |
| 2014/0273958 | A1* | 9/2014 | Messana | ........... H04W 36/0033 |
| | | | | 455/411 |

FOREIGN PATENT DOCUMENTS

| CN | 1645793 A | 7/2005 |
| CN | 1645826 A | 7/2005 |

(Continued)

OTHER PUBLICATIONS

S3-090301 Huawei,ZTE,"Editorial corrections for 33.402",3GPP TSG SA WG3 Security—S3#54, Florence, Italy—Jan. 19-23, 2009 ,total 20 pages.

(Continued)

*Primary Examiner* — Khoi V Le
(74) *Attorney, Agent, or Firm* — Hauptman Ham, LLP

(57) ABSTRACT

A secure access method performed by an authentication server includes receiving a first message from a non-3GPP access device. The method also includes performing fast re-authentication with the terminal when determining that fast re-authentication is allowed. The method further includes sending a second message to a home subscriber server. The second message carries a registration type identifier, an identifier of the terminal, and an address of the authentication server. The registration type identifier is used to indicate that current secure access of the terminal is secure access using a fast re-authentication procedure. The method additionally includes receiving a registration success indication from the home subscriber server. The method also includes sending an access success indication to the terminal based on the registration success indication.

20 Claims, 4 Drawing Sheets

(52) U.S. Cl.
CPC .......... *H04L 63/102* (2013.01); *H04W 12/06* (2013.01); *H04W 12/08* (2013.01)

(56) References Cited

FOREIGN PATENT DOCUMENTS

| | | | |
|---|---|---|---|
| CN | 1765082 | A | 4/2006 |
| CN | 101079786 | A | 11/2007 |
| CN | 101432717 | A | 5/2009 |
| CN | 101854629 | A | 10/2010 |
| CN | 106921965 | A | 7/2017 |
| EP | 1693995 | B1 | 3/2013 |
| WO | 2007127035 | A2 | 11/2007 |
| WO | 2016196958 | A1 | 12/2016 |

OTHER PUBLICATIONS

S3-131177 Ericsson et al.,"User profile fetching before authentication in WLAN interworking",3GPP TSG-SA WG3 Meeting #73,San Francisco, US, Nov. 11-15, 2013,total 19 pages.

XP051682238 Shen-Ho Lin et al.,"The Iterative Distributed Re-authentication Scheme Based on EAP-AKA in 3G/UMTS-WLAN Heterogeneous Mobile Networks ",ion process between the 2010 International Conference on Broadband, Wireless Computing, Comm,total 6 pages.

The extended European search report dated Jun. 19, 2020 from corresponding application No. EP 18845714.7.

Notice of Allowance dated Jul. 7, 2020 from corresponding application No. CN 201710703914.8.

C4-141893 Ericsson et al.,"Leading Digit of User-Name AVP",3GPP TSG CT4 Meeting #66bis,Sophia Antipolis, France; Oct. 20-24, 2014,total 40 pages.

3GPP TS 33.402 V14.2.0 (Jun. 2017),3rd Generation Partnership Project;Technical Specification Group Services and System Aspects;3GPP System Architecture Evolution (SAE);Security aspects of non-3GPP accesses(Release 14), total 72 pages.

Office Action dated Dec. 17, 2019 from corresponding application No. CN 201710703914.8.

International search report dated Oct. 18, 2018 from corresponding application No. PCT/CN2018/099337.

\* cited by examiner

SECURE ACCESS METHOD, DEVICE, AND SYSTEM

CROSS-REFERENCE TO RELATED APPLICATIONS

This application is a continuation of International Patent Application No. PCT/CN2018/099337, filed on Aug. 8, 2018, which claims priority to Chinese Patent Application No. 201710703914.8, filed on Aug. 16, 2017. The disclosures of the aforementioned applications are hereby incorporated by reference in their entireties.

TECHNICAL FIELD

This application relates to the field of communications technologies, and in particular, to a secure access method, device, and system.

BACKGROUND

With the development and popularization of intelligent terminals and wireless fidelity (WiFi) technologies, and a requirement of a code division multiple access (CDMA) operator for reusing an original access network of CDMA in a long term evolution (LTE) network, accessing a 3rd generation partnership project (3GPP) core network by using an intelligent terminal through a non-3rd generation partnership project (non-3GPP) access network (for example, WiFi or CDMA) is increasingly required, and is widely applied to a voice service over Wi-Fi (VoWiFi).

Currently, when a terminal accesses the 3GPP core network through a non-3GPP access network, the terminal usually implements secure access for non-3GPP access by using an extensible authentication protocol (EAP) authentication procedure. When initially accessing a network, the terminal performs secure access by using an EAP full authentication procedure. In the EAP full authentication procedure, an authentication server generates a fast re-authentication identifier of the terminal, and sends the fast re-authentication identifier of the terminal to the terminal. In this way, when the terminal re-accesses the network before deregistration, the terminal may perform secure access by using a simplified EAP fast re-authentication procedure. Specifically, in the EAP fast re-authentication procedure, the terminal may directly use the fast re-authentication identifier of the terminal as an identifier of the terminal to perform secure access of the terminal.

However, at present, there is no related solution to implement secure access by using the fast re-authentication procedure in next secure access if the terminal deregisters from the network after performing secure access by using a full authentication procedure.

SUMMARY

Embodiments of this application provide a secure access method, device, and system, to enable a terminal to still implement secure access by using a fast re-authentication procedure in next secure access, if the terminal deregisters from a network after performing secure access by using a full authentication procedure.

To achieve the foregoing objective, the embodiments of this application provide the following technical solutions.

According to a first aspect, a secure access method is provided, and the method includes: receiving, by a first authentication server, a first message from a non-3rd generation partnership project (non-3GPP) access device, where the first message carries a fast re-authentication identifier of a terminal; determining, by the first authentication server, that fast re-authentication is allowed; performing, by the first authentication server, fast re-authentication with the terminal; sending, by the first authentication server, a second message to a home subscriber server, where the second message carries a registration type identifier, an identifier of the terminal, and an address of the first authentication server, and the registration type identifier is used to indicate that current secure access of the terminal is secure access using a fast re-authentication procedure; receiving, by the first authentication server, a registration success indication from the home subscriber server if the home subscriber server determines, based on the identifier of the terminal, that an address of an authentication server corresponding to the terminal is not stored; and sending, by the first authentication server, an access success indication to the terminal based on the registration success indication. Based on the method, after the terminal performs secure access by using a full authentication procedure, if the terminal deregisters from a network, secure access may still be implemented by using a fast re-authentication procedure in next secure access.

In a possible design, the method further includes: receiving, by the first authentication server, an access network type or an access network identity from the non-3GPP access device; and the determining, by the first authentication server, that fast re-authentication is allowed includes: determining, by the first authentication server based on at least one of the access network type, the access network identity, information indicating whether a preconfigured home subscriber server supports fast re-authentication, or information indicating whether an access network is trustworthy, that fast re-authentication is allowed, where the information indicating whether the access network is trustworthy is determined based on the access network type or the access network identity. Based on the method, the first authentication server may determine that fast re-authentication is allowed.

In a possible design, the method further includes: receiving, by the first authentication server, a registration success indication from the home subscriber server if the home subscriber server determines, based on the identifier of the terminal, that the address of the first authentication server is stored; and sending, by the first authentication server, an access success indication to the terminal based on the registration success indication. Based on this method, secure access of the terminal can be implemented when the address of the first authentication server is stored in the home subscriber server.

In a possible design, the method further includes: receiving, by the first authentication server, a registration failure indication from the home subscriber server if the home subscriber server determines, based on the identifier of the terminal, that an address of a second authentication server is stored, where the registration failure indication includes the address of the second authentication server, and the address of the second authentication server is used to instruct the terminal to redirect to the second authentication server; and sending, by the first authentication server, an access failure indication to the terminal based on the registration failure indication. Based on this method, secure access of the terminal by using the second authentication server can be implemented when the address of the second authentication server is stored in the home subscriber server.

In a possible design, the method further includes: determining, by the first authentication server, that fast re-authentication is not allowed; and requesting, by the first authentication server, the terminal to implement secure access of the terminal based on a full authentication procedure. Based on the method, after determining that fast re-authentication is not allowed, the first authentication server may instruct the terminal to initiate secure access based on the full authentication procedure.

According to a second aspect, a secure access method is provided. The method includes: receiving, by a home subscriber server, a second message from a first authentication server, where the second message carries a registration type identifier, an identifier of a terminal, and an address of the first authentication server, and the registration type identifier is used to indicate that current secure access of the terminal is secure access using a fast re-authentication procedure; storing, by the home subscriber server, the address of the first authentication server based on the registration type identifier if the home subscriber server determines, based on the identifier of the terminal, that an address of an authentication server corresponding to the terminal is not stored; and sending, by the home subscriber server, a registration success indication to the first authentication server, and sending, by the first authentication server, an access success indication to the terminal based on the registration success indication. Based on the method, after the terminal performs secure access by using a full authentication procedure, if the terminal deregisters from a network, secure access may still be implemented by using a fast re-authentication procedure in next secure access.

In a possible design, the method further includes: sending, by the home subscriber server, a registration success indication to the first authentication server if the home subscriber server determines, based on the identifier of the terminal, that the address of the first authentication server is stored; and sending, by the first authentication server, an access success indication to the terminal based on the registration success indication. Based on the method, secure access of the terminal can be implemented when the address of the first authentication server is stored in the home subscriber server.

In a possible design, the method further includes: sending, by the home subscriber server, a registration failure indication to the first authentication server if the home subscriber server determines, based on the identifier of the terminal, that an address of a second authentication server is stored; and sending, by the first authentication server, an access failure indication to the terminal based on the registration failure indication, where the registration failure indication includes the address of the second authentication server, and the address of the second authentication server is used to instruct the terminal to redirect to the second authentication server. Based on this method, secure access of the terminal by using the second authentication server can be implemented when the address of the second authentication server is stored in the home subscriber server.

According to a third aspect, a first authentication server is provided. The first authentication server has functions of implementing the method according to the first aspect. The functions may be implemented by hardware, or may be implemented by hardware executing corresponding software. The hardware or software includes one or more modules corresponding to the foregoing functions.

According to a fourth aspect, a first authentication server is provided, including: a processor and a memory, where the memory is configured to store a computer executable instruction, the processor is connected to the memory, and when the first authentication server runs, the processor executes the computer executable instruction stored in the memory, so that the first authentication server performs the secure access method according to any one of the foregoing possible designs of the first aspect.

According to a fifth aspect, a computer-readable storage medium is provided, where the computer-readable storage medium stores an instruction, and when the instruction runs on a computer, the computer is enabled to perform the secure access method according to any one of the foregoing possible designs of the first aspect.

According to a sixth aspect, a computer program product including an instruction is provided, where when the computer program product runs on a computer, the computer is enabled to perform the secure access method according to any one of the foregoing possible designs of the first aspect.

According to a seventh aspect, a chip system is provided. The chip system includes a processor, configured to support a first authentication server in implementing a processing function in the foregoing aspects, for example, determining that fast re-authentication is allowed. In a possible design, the chip system further includes a memory. The memory is configured to store a program instruction and data for the first authentication server. The chip system may include a chip, or may include a chip and another discrete component.

For technical effects brought by any design manner of the third aspect to the seventh aspect, refer to technical effects brought by different design manners of the first aspect. Details are not described herein again.

According to an eighth aspect, a home subscriber server is provided. The home subscriber server has functions of implementing the method according to the second aspect. The functions may be implemented by hardware, or may be implemented by hardware executing corresponding software. The hardware or software includes one or more modules corresponding to the foregoing functions.

According to a ninth aspect, a home subscriber server is provided, including: a processor and a memory, where the memory is configured to store a computer executable instruction, the processor is connected to the memory, and when the home subscriber server runs, the processor executes the computer executable instruction stored in the memory, and the home subscriber server performs the secure access method according to any one of the foregoing possible designs of the second aspect.

According to a tenth aspect, a computer-readable storage medium is provided, where the computer-readable storage medium stores an instruction, and when the instruction runs on a computer, the computer is enabled to perform the secure access method according to any one of the foregoing possible designs of the second aspect.

According to an eleventh aspect, a computer program product including an instruction is provided, where when the computer program product runs on a computer, the computer is enabled to perform the secure access method according to any one of the foregoing possible designs of the second aspect.

According to a twelfth aspect, a chip system is provided. The chip system includes a processor, configured to support a home subscriber server in implementing a processing function in the foregoing aspects, for example, determining, based on an identifier of a terminal, that an address of an authentication server corresponding to the terminal is not stored. In a possible design, the chip system further includes a memory. The memory is configured to store a program instruction and data for the home subscriber server. The chip system may include a chip, or may include a chip and another discrete component.

For technical effects brought by any design manner of the eighth aspect to the twelfth aspect, refer to technical effects brought by different design manners of the second aspect. Details are not described herein again.

According to a thirteenth aspect, a secure access system is provided. The secure access system includes the first authentication server according to any one of the foregoing aspects and the home subscriber server according to any one of the foregoing aspects.

The aspects or other aspects of this application are more concise and intelligible in descriptions of the following embodiments.

DESCRIPTION OF EMBODIMENTS

The following describes the technical solutions in the embodiments of this application with reference to the accompanying drawings in the embodiments of this application. In description of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the description of this application, the term "a plurality of" means two or more than two unless otherwise specified. In addition, to clearly describe the technical solutions in the embodiments of this application, terms such as "first" and "second" are used in the embodiments of this application to distinguish between same items or similar items that have basically the same functions or purposes. A person skilled in the art may understand that the terms such as "first" and "second" do not limit a quantity or an execution sequence.

The network architecture and the service scenario described in the embodiments of this application are intended to describe the technical solutions in the embodiments of this application more clearly, and do not constitute a limitation on the technical solutions provided in the embodiments of this application. A person of ordinary skill in the art may know that: With evolution of the network architecture and emergence of new service scenarios, the technical solutions provided in the embodiments of this application are also applicable to similar technical problems.

Figure 1:
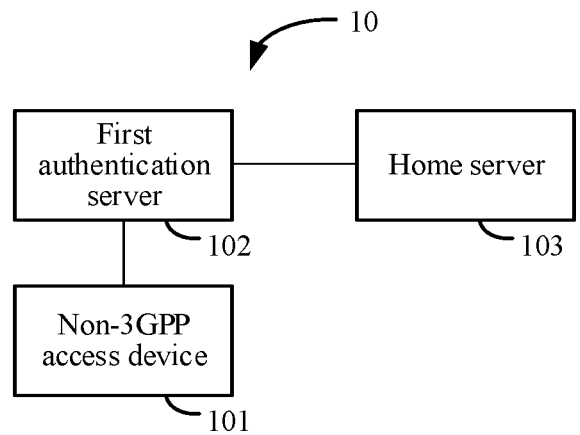
FIG. 1 is a schematic architectural diagram of a secure access system, in accordance with one or more embodiments.

FIG. 1 is a schematic architectural diagram of a secure access system 10, in accordance with one or more embodiments. The secure access system 10 includes a non-3GPP access device 101, a first authentication server 102, and a home subscriber server 103.

The terminal accesses a 3GPP core network by using the non-3GPP access device 101.

The non-3GPP access device 101 is configured to send a first message to the first authentication server 102, where the first message carries a fast re-authentication identifier of the terminal.

The first authentication server 102 is configured to: receive the first message from the non-3GPP access device 101, and after determining that fast re-authentication is allowed, perform fast re-authentication with the terminal.

The first authentication server 102 is further configured to send a second message to the home subscriber server 103, where the second message carries a registration type identifier, an identifier of the terminal, and an address of the first authentication server, and the registration type identifier is used to indicate that current secure access of the terminal is secure access using a fast re-authentication procedure.

The home subscriber server 103 is configured to receive the second message from the first authentication server 102.

The home subscriber server 103 is further configured to: store the address of the first authentication server based on the registration type identifier if the home subscriber server 103 determines, based on the identifier of the terminal, that an address of an authentication server corresponding to the terminal is not stored; and send a registration success indication to the first authentication server 102.

The first authentication server 102 is further configured to: receive the registration success indication from the home subscriber server 103, and send an access success indication to the terminal based on the registration success indication.

In some embodiments, the non-3GPP access device 101, the first authentication server 102, and the home subscriber server 103 in FIG. 1 may directly communicate with each other, or may communicate with each other through forwarding by another network device. This is not specifically limited in the embodiments of this application.

In the secure access system provided in the embodiments of this application, when a terminal performs secure access by using a fast re-authentication procedure, if a home subscriber server determines, based on an identifier of the terminal, that an address of an authentication server corresponding to the terminal is not stored, the home subscriber server may send a registration success indication to a first authentication server, so that the first authentication server may send an access success indication to the terminal based on the registration success indication. The registration type identifier is used to indicate that current secure access of the terminal is secure access using the fast re-authentication procedure. Therefore, based on the method, after the terminal performs secure access by using a full authentication procedure, if the terminal deregisters from a network, secure access may still be implemented by using the fast re-authentication procedure in next secure access.

In some embodiments, the secure access system 10 shown in FIG. 1 may be applied to a 4th generation (4G) that supports non-3GPP access, a 5th generation (5G) network that supports non-3GPP access, and another future network that supports non-3GPP access. This is not specifically limited in the embodiments of this application.

If the secure access system 10 shown in FIG. 1 can be applied to the 4G network that supports non-3GPP access, the first authentication server may be a first 3GPP authentication, authorization, and accounting (AAA) server, and the home subscriber server may be a home subscriber server (HSS). If the secure access system 10 shown in FIG. 1 can be applied to the 5G network that supports non-3GPP access, the first authentication server may be a first authentication service function (AUSF) entity, and the home subscriber server may be a unified data management (UDM) entity. If the secure access system 10 shown in FIG. 1 can be applied to another network that supports non-3GPP access, the first authentication server and the home subscriber server may have other names. This is not specifically limited in the embodiments of this application.

In some embodiments, the terminal may include various handheld devices, vehicle-mounted devices, wearable devices, computing devices that have a wireless communications function, or other processing devices connected to a wireless modem. The terminal may further include a subscriber unit, a cellular phone, a smartphone, a wireless data card, a personal digital assistant (PDA) computer, a tablet computer, a wireless modem, a handheld device, a laptop computer, a cordless phone, a wireless local loop (WLL) station, a machine type communication (MTC) terminal, user equipment (UE), a mobile station (MS), a terminal device, and the like. For ease of description, in this application, the devices mentioned above are collectively referred to as terminals. In addition, the terminal in the embodiments of this application may be a 5G terminal, or may be a conventional terminal, for example, a 4G terminal or a 3G terminal. This is not specifically limited in the embodiments of this application.

In some embodiments, a non-3GPP access device is a device that accesses the 3GPP core network by using a non-3GPP network, for example, may be a non-3GPP access gateway (N3G-GW). This is not specifically limited in the embodiments of this application.

In some embodiments, the first authentication server or the home subscriber server in FIG. 1 may be implemented by one entity device, or may be jointly implemented by a plurality of entity devices, or may be a logical function module in one entity device. This is not specifically limited in the embodiments of this application.

Figure 2:
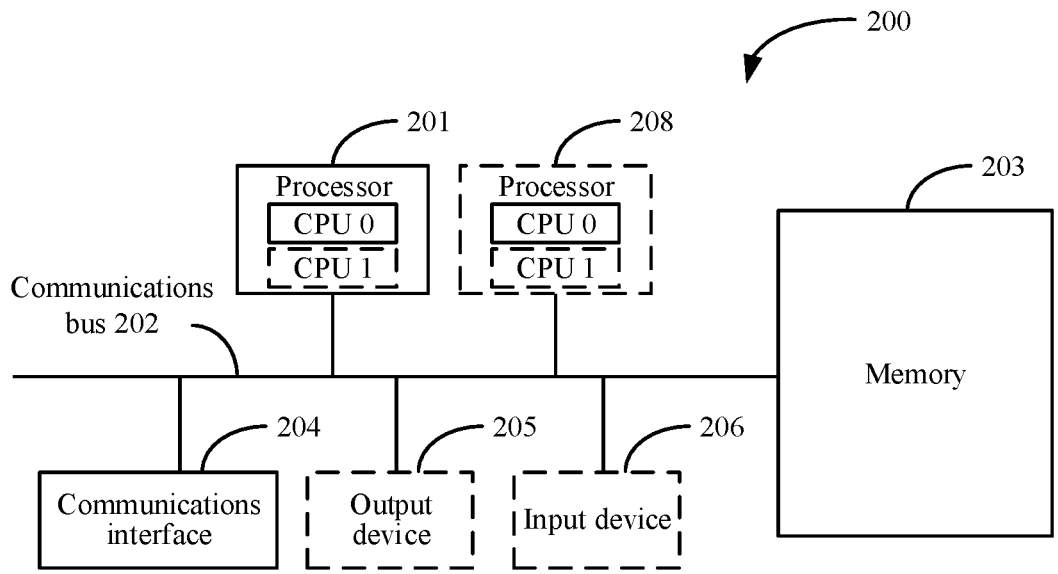
FIG. 2 is a schematic structural diagram of hardware of a communications device, in accordance with one or more embodiments.

For example, the first authentication server or the home subscriber server in FIG. 1 may be implemented by using a communications device in FIG. 2. FIG. 2 is a schematic structural diagram of hardware of a communications device, in accordance with one or more embodiments. The communications device 200 includes at least one processor 201, a communications bus 202, a memory 203, and at least one communications interface 204.

The processor 201 may be a general-purpose central processing unit (CPU), a microprocessor, an application-specific integrated circuit (ASIC), or one or more integrated circuits that are configured to control execution of a program in a solution of this application.

The communications bus 202 may include a channel for transmitting information between the foregoing components.

The communications interface 204, which uses any apparatus such as a transceiver, is configured to communicate with another device or communications network, such as Ethernet, a radio access network (RAN), or a wireless local area network (WLAN).

The memory 203 may be a read-only memory (ROM) or another type of static storage device that can store static information and instructions, or random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray optical disc, and the like), a magnetic disk storage medium or another magnetic storage device, or any other medium that can be used to carry or store expected program code in a form of an instruction or a data structure and that can be accessed by a computer. However, the memory 203 is not limited thereto. The memory may exist independently, and is connected to a processor by using a bus. The memory may be alternatively integrated with a processor.

The memory 203 is configured to store application program code for executing the solutions in this application, and the processor 201 controls the execution. The processor 201 is configured to execute the application program code stored in the memory 203, to implement a secure access method provided in the following embodiment of this application.

In some embodiments, the processor 201 may include one or more CPUs, for example, a CPU 0 and a CPU 1 in FIG. 2.

In some embodiments, the communications device 200 may include a plurality of processors, for example, the processor 201 and a processor 208 in FIG. 2. Each of these processors may be a single-core (single-CPU) processor, or may be a multi-core (multi-CPU) processor. The processor herein may be one or more devices, circuits, and/or processing cores configured to process data (for example, a computer program instruction).

In some embodiments, the communications device 200 may further include an output device 205 and an input device 206. The output device 205 communicates with the processor 201, and may display information in a plurality of manners. For example, the output device 205 may be a liquid crystal display (LCD), a light emitting diode (LED) display device, a cathode ray tube (CRT) display device, a projector, or the like. The input device 206 communicates with the processor 201, and may receive user input in a plurality of manners. For example, the input device 206 may be a mouse, a keyboard, a touchscreen device, a sensing device, or the like.

The communications device 200 may be a general-purpose communications device or a dedicated communications device. In some embodiments, the communications device 200 may be a desktop computer, a portable computer, a network server, a palmtop computer (PDA), a mobile phone, a tablet computer, a wireless terminal device, an embedded device, or a device with a structure similar to that in FIG. 2. A type of the communications device 200 is not limited in the embodiments of this application.

The following describes in detail a secure access method provided in the discussed embodiments of this application with reference to FIG. 1 and FIG. 2.

Figure 3:
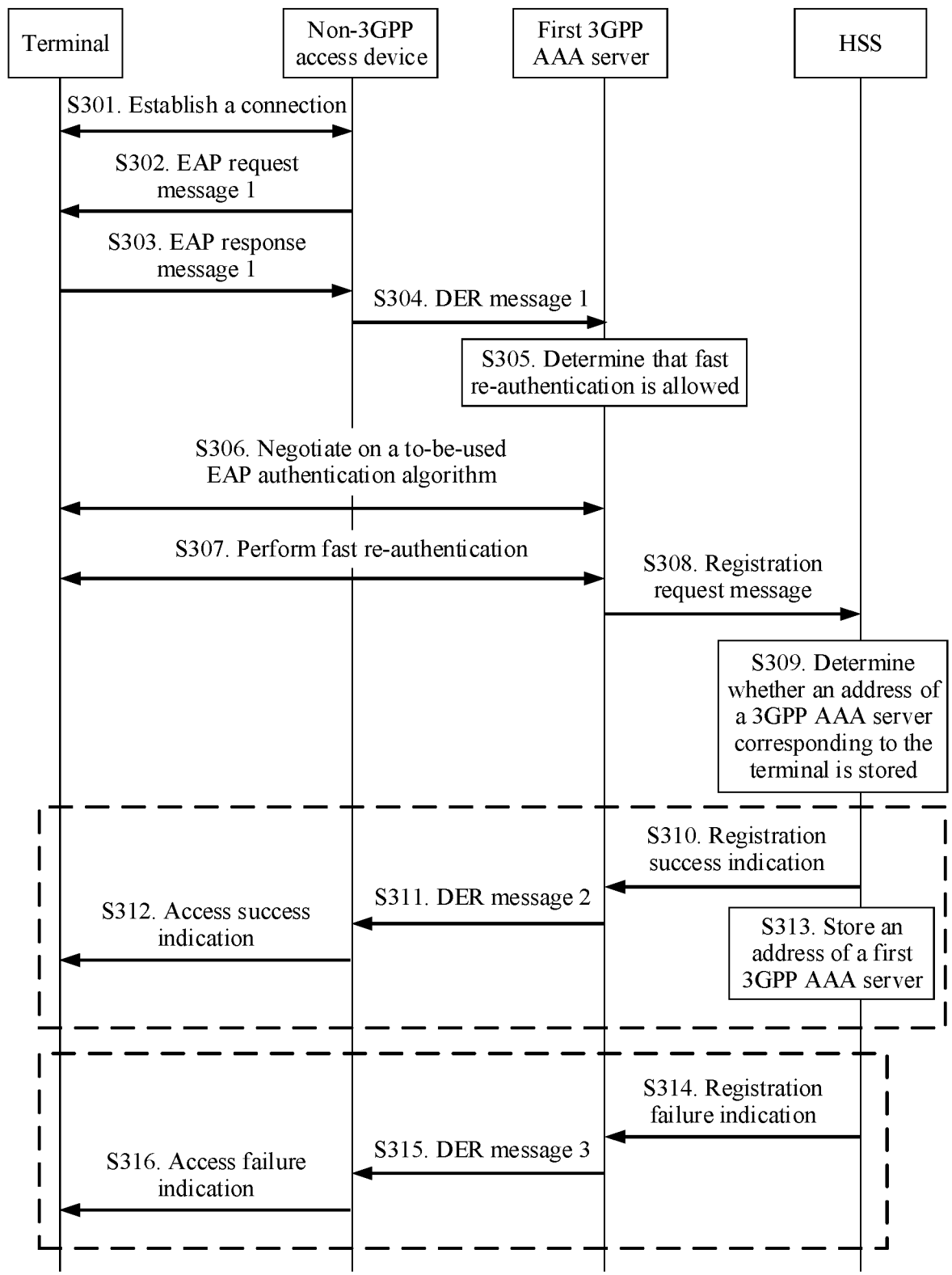
FIG. 3 is a schematic flowchart 1 of a secure access method, in accordance with one or more embodiments.

For example, the secure access system 10 shown in FIG. 1 is applied to a 4G network that supports non-3GPP access, the first authentication server is a first 3GPP AAA server, and the home subscriber server is an HSS. FIG. 3 shows a secure access method, in accordance with one or more embodiments. According to the secure access method, after the first 3GPP AAA server performs fast re-authentication with a terminal, the first 3GPP AAA server sends a registration type identifier to the HSS. The registration type identifier is used to indicate that current secure access of the terminal is secure access using a fast re-authentication procedure. In this way, after determining, based on an identifier of the terminal, that an address of a 3GPP AAA server corresponding to the terminal is not stored, the home subscriber server may send a registration success indication to the first 3GPP AAA server based on the registration type identifier, and the first 3GPP AAA server sends an access success indication to the terminal based on the registration success indication. In this way, secure access is implemented by using the fast re-authentication procedure. The method includes the following steps.

S301. The terminal establishes a connection to a non-3GPP access device.

For a process of establishing a connection between the terminal and the non-3GPP access device, refer to an existing implementation. Details are not described herein.

S302. The non-3GPP access device sends an EAP request message 1 to the terminal. Correspondingly, the terminal receives the EAP request message 1 from the non-3GPP access device.

The EAP request message 1 is used to request the identifier of the terminal.

In some embodiments, the EAP request message 1 may be, for example, an EAP-request/identity (ID) message.

S303. The terminal sends an EAP response message 1 to the non-3GPP access device. Correspondingly, the non-3GPP access device receives the EAP response message 1 from the terminal. The EAP response message 1 carries a fast re-authentication identifier of the terminal.

In this embodiment of this application, the fast re-authentication identifier of the terminal is generated and sent by the 3GPP AAA server to the terminal in previous full authentication performed by the terminal. For details, refer to an existing authentication procedure. Details are not described herein.

In some embodiments, the EAP response message 1 may be, for example, an EAP-response/identity message.

S304. The non-3GPP access device sends a diameter EAP request (DER) message 1 to the first 3GPP AAA server. Correspondingly, the 3GPP AAA server receives the DER message 1 from the non-3GPP access device. The DER message 1 includes the EAP response message 1.

In some embodiments, DER message 1 may further include an access network type, an access network identity, or the like. This is not specifically limited in the embodiments of this application. The access network type may be, for example, Wi-Fi or CDMA. This is not specifically limited in the embodiments of this application.

S305. The first 3GPP AAA server determines that fast re-authentication is allowed.

In some embodiments, the first 3GPP AAA server may determine, based on at least one of the access network type in the DER message 1, the access network identity in the DER message 1, information indicating whether a preconfigured HSS supports fast re-authentication, or information indicating whether an access network is trustworthy, that fast re-authentication is allowed, where the information indicating whether the access network is trustworthy is determined based on the access network type in the DER message 1 or the access network identity in the DER message 1.

For example, assuming that the information indicating whether the preconfigured HSS supports fast re-authentication is that the HSS supports registration through fast re-authentication, the first 3GPP AAA server may determine, based on the information indicating whether the preconfigured HSS supports fast re-authentication, that fast re-authentication is allowed. Alternatively, assuming that an access network determined based on the access network type in the DER message 1 or the access network identity in the DER message 1 is trustworthy, the first 3GPP AAA server may determine, based on the information indicating whether the access network is trustworthy, that fast re-authentication is allowed.

S306. The first 3GPP AAA server negotiates with the terminal on a to-be-used EAP authentication algorithm by using an EAP message.

In some embodiments, the EAP authentication algorithm may be, for example, an EAP authentication and key agreement (EAP-AKA) authentication algorithm or an improved EAP-AKA (EAP-AKA') authentication algorithm. This is not specifically limited in the embodiments of this application.

For related implementation of negotiation between the first 3GPP AAA server and the terminal on the EAP authentication algorithm, refer to an existing implementation. Details are not described herein.

S307. The first 3GPP AAA server and the terminal perform fast re-authentication by using the EAP authentication algorithm.

For related implementation of fast re-authentication performed by the first 3GPP AAA server and the terminal by using the EAP authentication algorithm, refer to an existing implementation. Details are not described herein.

S308. The first 3GPP AAA server sends a registration request message to the HSS. Correspondingly, the HSS receives the registration request message from the first 3GPP AAA server.

The registration request message carries the registration type identifier, the identifier of the terminal, and an address of the first 3GPP AAA server. The registration type identifier is used to indicate that current secure access of the terminal is secure access using the fast re-authentication procedure.

In some embodiments, the registration request message may further carry the access network identity, the access network type, or the like. This is not specifically limited in the embodiments of this application.

In some embodiments, the identifier of the terminal may be an international mobile subscriber identity (IMSI) or the like. This is not specifically limited in the embodiments of this application.

S309. The HSS determines, based on the identifier of the terminal, whether the address of the 3GPP AAA server corresponding to the terminal is stored.

In some embodiments, the HSS may query a database to determine whether the address of the 3GPP AAA server corresponding to the terminal is stored.

If the HSS determines that the address of the 3GPP AAA server corresponding to the terminal is not stored, steps S310 to S313 are to be performed.

If the HSS determines that the address of the first 3GPP AAA server is stored, steps S310 to S312 are to be performed.

If the HSS determines that an address of a second 3GPP AAA server is stored, steps S314 to S316 are to be performed.

S310. The HSS sends the registration success indication to the first 3GPP AAA server. Correspondingly, the first 3GPP AAA server receives the registration success indication from the HSS.

S311. The first 3GPP AAA server sends a DER message 2 to the non-3GPP access device based on the registration success indication. Correspondingly, the non-3GPP access device receives the DER message 2 from the first 3GPP AAA server. The DER message 2 includes the access success indication.

In some embodiments, the DER message 2 may further include information such as quality of service (QoS) and an access point name (APN). This is not specifically limited in the embodiments of this application.

S312. The non-3GPP access device sends the access success indication to the terminal. Correspondingly, the terminal receives the access success indication from the non-3GPP access device.

S313. The first 3GPP AAA server stores the address of the first 3GPP AAA server.

After the first 3GPP AAA server stores the address of the first 3GPP AAA server, when the terminal subsequently initiates secure access, the HSS may send a registration success indication to the first 3GPP AAA server based on the address of first 3GPP AAA server. This is not specifically limited in the embodiments of this application.

S314. The HSS sends a registration failure indication to the first 3GPP AAA server. Correspondingly, the first 3GPP AAA server receives the registration failure indication from the HSS. The registration failure indication includes the address of the second 3GPP AAA server, and the address of the second 3GPP AAA server is used to instruct the terminal to redirect to the second 3GPP AAA server.

S315. The first 3GPP AAA server sends a DER message 3 to the non-3GPP access device based on the registration failure indication. Correspondingly, the non-3GPP access device receives the DER message 3 from the first 3GPP AAA server. The DER message 2 includes an access failure indication, where the access failure indication includes the address of the second 3GPP AAA server, and the address of the second 3GPP AAA server is used to instruct the terminal to redirect to the second 3GPP AAA server.

S316. The non-3GPP access device sends the access failure indication to the terminal. Correspondingly, the terminal receives the access failure indication from the non-3GPP access device.

In some embodiments, after receiving the access failure indication, the terminal may redirect to the second 3GPP AAA server based on the address of the second 3GPP AAA server. For details, refer to an existing redirection procedure, and details are not described herein.

In the secure access method provided in this embodiment of this application, when the terminal performs secure access by using a fast re-authentication procedure, if the HSS determines, based on the identifier of the terminal, that the address of the 3GPP AAA server corresponding to the terminal is not stored, the HSS may send a registration success indication to the first 3GPP AAA server based on the registration type identifier. In this way, the first 3GPP AAA server may send an access success indication to the terminal based on the registration success indication. The registration type identifier is used to indicate that current secure access of the terminal is secure access using the fast re-authentication procedure. Therefore, based on the method, after the terminal performs secure access by using a full authentication procedure, if the terminal deregisters from a network, secure access can still be implemented by using the fast re-authentication procedure in next secure access.

Actions of the first 3GPP AAA server or the HSS in the foregoing steps S301 to S316 may be performed by the processor 201 in the communications device 200 shown in FIG. 2 by invoking application program code stored in the memory 203. This is not limited in the embodiments of this application.

Figure 4:
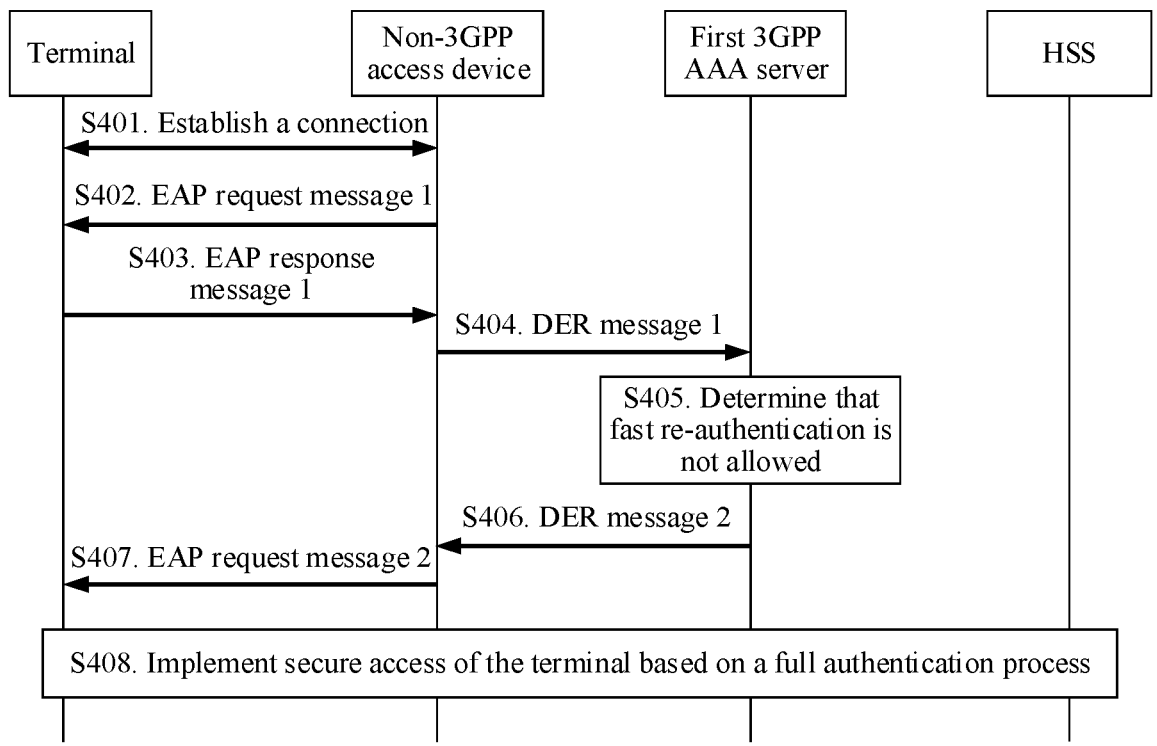
FIG. 4 is a schematic flowchart 2 of a secure access method, in accordance with one or more embodiments.

In some embodiments, the secure access system 10 shown in FIG. 1 is applied to a 4G network that supports non-3GPP access, the first authentication server is a first 3GPP AAA server, and the home subscriber server is an HSS. FIG. 4 is another secure access method, in accordance with one or more embodiments. According to the secure access method, after determining that fast re-authentication is not allowed, the first 3GPP AAA server instructs the terminal to initiate secure access based on a full authentication procedure. The method includes the following steps.

S401 to S404 are the same as S301 to S304. For details, refer to the embodiment shown in FIG. 3. Details are not described herein again.

S405. The first 3GPP AAA server determines that fast re-authentication is not allowed.

In some embodiments, the first 3GPP AAA server may determine, based on at least one of an access network type in a DER message 1, an access network identity in the DER message 1, information indicating whether a preconfigured HSS supports fast re-authentication, or information indicating whether an access network is trustworthy, that fast re-authentication is not allowed, where the information indicating whether the access network is trustworthy is determined based on the access network type in the DER message 1 or the access network identity in the DER message 1.

For example, assuming that the information indicating whether the preconfigured HSS does not support fast re-authentication is that the HSS does not support registration through fast re-authentication, the first 3GPP AAA server may determine, based on the information indicating whether the preconfigured HSS does not support fast re-authentication, that fast re-authentication is not allowed. Alternatively, assuming that the access network determined based on the access network type in the DER message 1 or determined based on the access network identity in the DER message 1 is trustworthy, the first 3GPP AAA server may determine, based on the information indicating whether the access network is untrustworthy, that fast re-authentication is not allowed.

S406. The first 3GPP AAA server sends a DER message 2 to a non-3GPP access device. Correspondingly, the non-3GPP access device receives the DER message 2 from the first 3GPP AAA server. The DER message 2 includes an EAP request message 2. The EAP request message 2 is used to request to implement secure access of the terminal based on the full authentication procedure.

S407. The non-3GPP access device sends the EAP request message 2 to the terminal. Correspondingly, the terminal receives the EAP request message 2 from the non-3GPP access device.

S408. The terminal initiates, based on the EAP request message 2, secure access based on the full authentication procedure.

According to the secure access method provided in this embodiment of this application, after determining that fast re-authentication is not allowed, the first 3GPP AAA server may instruct the terminal to initiate secure access based on the full authentication procedure.

Actions of the first 3GPP AAA server or the HSS in the foregoing steps S401 to S408 may be performed by the processor 201 in the communications device 200 shown in FIG. 2 by invoking application program code stored in the memory 203. This is not limited in the embodiments of this application.

The foregoing mainly describes the solutions provided in the embodiments of this application from a perspective of interaction between network elements. It can be understood that, to implement the foregoing functions, the first authentication server or the home subscriber server includes corresponding hardware structures and/or software modules for performing the functions. A person skilled in the art should easily aware that, in combination with the examples described in the embodiments disclosed in this specification, units and algorithm steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, function module division may be performed on the first authentication server or the home subscriber server according to the foregoing method examples. For example, each function module may be divided to correspond to each function, or two or more functions may be integrated into one processing module. The integrated module may be implemented in a form of hardware, or may be implemented in a form of a software function module. It should be noted that the module division in the embodiments of this application is an example, and is merely logical function division. There may be another division manner in actual implementation.

Figure 5:
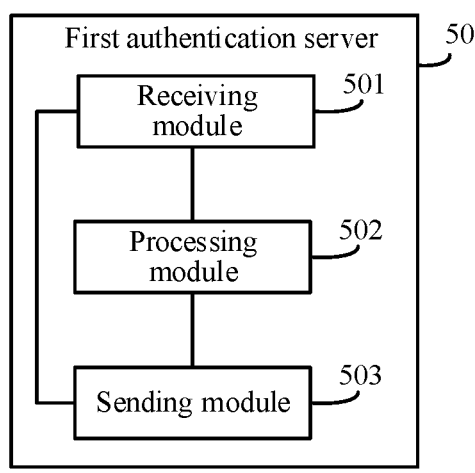
FIG. 5 is a schematic structural diagram of a first authentication server, in accordance with one or more embodiments.

For example, when the function modules are divided through integration, FIG. 5 is a possible schematic structural diagram of a first authentication server 50, in accordance with one or more embodiments. The first authentication server 50 includes: a receiving module 501, a processing module 502, and a sending module 503. The receiving module 501 is configured to receive a first message from a non-3GPP access device, where the first message carries a fast re-authentication identifier of a terminal. The processing module 502 is configured to determine that fast re-authentication is allowed. The processing module 502 is further configured for the first authentication server to perform fast re-authentication with the terminal. The sending module 503 is configured to send a second message to a home subscriber server, where the second message carries a registration type identifier, an identifier of the terminal, and an address of the first authentication server, and the registration type identifier is used to indicate that current secure access of the terminal is secure access using a fast re-authentication procedure. The receiving module 501 is further configured to receive a registration success indication from the home subscriber server if the home subscriber server determines, based on the identifier of the terminal, that an address of an authentication server corresponding to the terminal is not stored. The sending module 503 is further configured to send an access success indication to the terminal based on the registration success indication.

In some embodiments, the receiving module 501 is further configured to receive an access network type or an access network identity from the non-3GPP access device. The processing module 502 is configured to determine, based on at least one of the access network type, the access network identity, information indicating whether a preconfigured home subscriber server supports fast re-authentication, or information indicating whether an access network is trustworthy, that fast re-authentication is allowed, where the information indicating whether the access network is trustworthy is determined based on the access network type or the access network identity.

In some embodiments, the receiving module 501 is further configured to receive a registration success indication from the home subscriber server if the home subscriber server determines, based on the identifier of the terminal, that the address of the first authentication server is stored. The sending module 503 is further configured to send an access success indication to the terminal based on the registration success indication.

In some embodiments, the receiving module 501 is further configured to receive a registration failure indication from the home subscriber server if the home subscriber server determines, based on the identifier of the terminal, that an address of a second authentication server is stored, where the registration failure indication includes the address of the second authentication server, and the address of the second authentication server is used to instruct the terminal to redirect to the second authentication server. The sending module 503 is further configured to send an access failure indication to the terminal based on the registration failure indication.

In some embodiments, the processing module 502 is further configured to determine that fast re-authentication is not allowed. The sending module 503 is further configured to request the terminal to implement secure access of the terminal based on a full authentication procedure.

All related content of the steps in the foregoing method embodiments may be cited in function descriptions of corresponding function modules. Details are not described herein again.

In some embodiments, the first authentication server 50 is presented in a form of functional modules divided through integration. The "module" herein may be an application-specific integrated circuit (ASIC), a circuit, a processor and a memory that execute one or more software programs or firmware programs, an integrated logic circuit, and/or another component that can provide the foregoing functions. In some embodiments, the first authentication server 50 may use a form shown in FIG. 2. For example, the receiving module 501, the processing module 502, and the sending module 503 in FIG. 5 may be implemented by using the processor 201 and the memory 203 in FIG. 2. In some embodiments, the receiving module 501, the processing module 502, and the sending module 503 may be performed by the processor 201 by invoking application program code stored in the memory 203. This is not limited in the embodiments of this application.

The first authentication server provided in this embodiment of this application may be configured to perform the foregoing secure access method. Therefore, for technical effects that can be obtained by the first authentication server, refer to the foregoing method embodiments. Details are not described in the embodiments of this application again.

Figure 6:
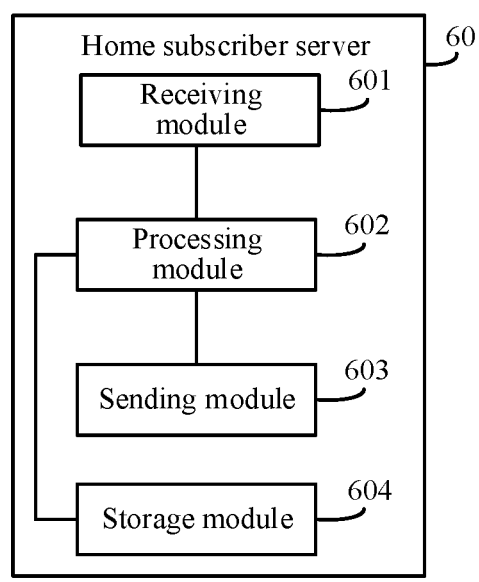
FIG. 6 is a schematic structural diagram of a home subscriber server, in accordance with one or more embodiments.

For example, when the function modules are divided through integration, FIG. 6 is a possible schematic structural diagram of a home subscriber server 60, in accordance with one or more embodiments. The home subscriber server 60 includes: a receiving module 601, a processing module 602, a storage module 603, and a sending module 604. The receiving module 601 is configured to receive a second message from a first authentication server, where the second message carries a registration type identifier, an identifier of a terminal, and an address of the first authentication server, and the registration type identifier is used to indicate that current secure access of the terminal is secure access using a fast re-authentication procedure. The processing module 602 is configured to determine, based on the identifier of the terminal, that an address of an authentication server corresponding to the terminal is not stored. The storage module 604 is configured to store the address of the first authentication server based on the registration type identifier. The sending module 603 is configured to send a registration success indication to the first authentication server, and the first authentication server sends an access success indication to the terminal based on the registration success indication.

In some embodiments, the processing module 602 is further configured to determine, based on the identifier of the terminal, that the address of the first authentication server is stored. The sending module 603 is further configured to send a registration success indication to the first authentication server, and the first authentication server sends an access success indication to the terminal based on the registration success indication.

In some embodiments, the processing module 602 is further configured to determine, based on the identifier of the terminal, that an address of a second authentication server is stored. The sending module 603 is further configured to send a registration failure indication to the first authentication server, and the first authentication server sends an access failure indication to the terminal based on the registration failure indication, where the registration failure indication includes the address of the second authentication server, and the address of the second authentication server is used to instruct the terminal to redirect to the second authentication server.

All related content of the steps in the foregoing method embodiments may be cited in function descriptions of corresponding function modules. Details are not described herein again.

In some embodiments, the home subscriber server 60 is presented in a form of functional modules divided through integration. The "module" herein may be an application-specific integrated circuit (ASIC), a circuit, a processor and a memory that execute one or more software programs or firmware programs, an integrated logic circuit, and/or another component that can provide the foregoing functions. In a simple embodiment, a person skilled in the art may figure out that the home subscriber server 60 may use a form shown in FIG. 2. For example, the receiving module 601, the processing module 602, the storage module 603, and the sending module 604 in FIG. 6 may be implemented by using the processor 201 and the memory 203 in FIG. 2. In some embodiments, the receiving module 601, the processing module 602, the storage module 603, and the sending module 604 may be performed by the processor 201 by invoking application program code stored in the memory 203. This is not limited in the embodiments of this application.

The home subscriber server provided in this embodiment of this application may be configured to perform the foregoing secure access method. Therefore, for technical effects that can be obtained by the home subscriber server, refer to the foregoing method embodiments. Details are not described in this embodiment of this application again.

In the foregoing embodiments, the first authentication server and the home subscriber server are presented in a form of functional modules divided through integration. Certainly, in the embodiments of this application, function modules of the first authentication server or the home subscriber server may be divided to correspond to each function. This is not specifically limited in the embodiments of this application.

Optionally, an embodiment of this application provides a chip system. The chip system includes a processor, configured to support a first authentication server in implementing the foregoing secure access methods, for example, determining that fast re-authentication is allowed. In a possible design, the chip system further includes a memory. The memory is configured to store a program instruction and data for the first authentication server. The chip system may include a chip, or may include a chip and another discrete component. This is not specifically limited in the embodiments of this application.

Optionally, an embodiment of this application provides a chip system. The chip system includes a processor, configured to support a home subscriber server in implementing the foregoing secure access methods, for example, determining, based on an identifier of a terminal, that an address of an authentication server corresponding to the terminal is not stored. In some embodiments, the chip system further includes a memory. The memory is configured to store a program instruction and data for the home subscriber server. The chip system may include a chip, or may include a chip and another discrete component. This is not specifically limited in the embodiments of this application.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "including" (including) does not exclude another component or another step, and "a" or "one" does not exclude a case of "a plurality of". A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, apparently, various modifications and combinations may be made to this application without departing from the spirit and scope of this application. Correspondingly, the specification and accompanying drawings are merely example descriptions of this application defined by the appended claims, and are considered as any or all of modifications, variations, combinations, or equivalents that cover the scope of this application. Apparently, a person skilled in the art can make various modifications and variations to this application without departing from the spirit and scope of this application. In this way, this application is intended to cover these modifications and variations of this application provided that they fall within the scope of protection defined by the following claims and their equivalent technologies.

What is claimed is:

1. A secure access method, comprising:
receiving, by an authentication server comprising a hardware processor, a first message from a non-3rd generation partnership project (non-3GPP) access device having connectivity to an access network and the authentication server, wherein the first message carries a fast re-authentication identifier of a terminal attempting to re-access a core network by way of the non-3GPP access device, wherein the terminal previously accessed the core network by way of a secure access using a full extensible authentication protocol (EAP) authentication procedure, and the terminal deregistered from the core network after the secure access of the core network using the full EAP authentication procedure prior to attempting to re-access the core network;
determining, by the authentication server, that fast re-authentication allowed based on information included in the first message indicating whether the access network is trustworthy;
performing, by the authentication server, fast re-authentication with the terminal to implement a current secure access by the terminal;
sending, by the authentication server, a second message to a home subscriber server, wherein the second message carries a registration type identifier, an identifier of the terminal, and an address of the authentication server, and the registration type identifier is used to indicate that the current secure access of the terminal is secure access using a fast re-authentication procedure;
receiving, by the home subscriber server, the second message;
sending, by the home subscriber server, a registration success indication to the authentication server;
receiving, by the authentication server, the registration success indication; and
sending, by the authentication server, an access success indication to the terminal based on the registration success indication.

2. The method according to claim 1, wherein the method further comprises:
receiving, by the authentication server, an access network type or an access network identity from the non-3GPP access device; and
the determining, by the authentication server, that fast re-authentication is allowed comprises:
determining, by the authentication server, that fast re-authentication is allowed based on the information indicating whether the access network is trustworthy and preconfigured information indicating whether the home subscriber server supports fast re-authentication.

3. The method according to claim 1, wherein the method further comprises:
determining, by the home subscriber server, based on the identifier of the terminal that the address of the authentication server is not stored.

4. The method according to claim 1, wherein the method further comprises:
determining, by the home subscriber server, based on the identifier of the terminal, that the address of the authentication server is stored.

5. The method according to claim 1, wherein the authentication server is a first authentication server, and the method further comprises:
determining, by the home subscriber server, based on the identifier of the terminal, that an address of a second authentication server is stored;
sending a registration failure indication to the first authentication server, wherein the registration failure indication comprises the address of the second authentication server, and the address of the second authentication server instructs the terminal to redirect to the second authentication server;
receiving, by the first authentication server, the registration failure indication; and
sending, by the first authentication server, an access failure indication to the terminal based on the registration failure indication.

6. The method according to claim 1, wherein the method further comprises:
determining, by the authentication server, that fast re-authentication is not allowed; and
requesting, by the authentication server, the terminal to implement secure access of the terminal based on the full EAP authentication procedure.

7. An authentication server, comprising:
at least one processor, and a memory storing computer-executable instructions that, when executed by the at least one processor, cause the authentication server to:
receive a first message from a non-3rd generation partnership project (non-3GPP) access device having connectivity to an access network and the authentication server, wherein the first message carries a fast re-authentication identifier of a terminal attempting to re-access a core network by way of the non-3GPP access device, wherein the terminal previously accessed the core network by way of a secure access using a full extensible authentication protocol (EAP) authentication procedure, and the terminal deregistered from the core network after the secure access of the core network using the full EAP authentication procedure prior to attempting to re-access the core network;
determine that fast re-authentication is allowed based on information included in the first message indicating whether the access network is trustworthy;
perform fast re-authentication with the terminal to implement a current secure access by the terminal;
send a second message to a home subscriber server, wherein the second message carries a registration type identifier, an identifier of the terminal, and an address of the first authentication server, and the registration type identifier is used to indicate that current secure access of the terminal is secure access using a fast re-authentication procedure;
receive a registration success indication from the home subscriber server; and
send an access success indication to the terminal based on the registration success indication.

8. The authentication server according to claim 7, wherein the authentication server is further caused to:
receive an access network type or an access network identity from the non-3GPP access device; and
determine that fast re-authentication is allowed based on the information indicating whether the access network is trustworthy and preconfigured information indicating whether the home subscriber server supports fast re-authentication.

9. The authentication server according to claim 7, wherein authentication server is further caused to:
determine, based on the identifier of the terminal that the address of the authentication server is not stored.

10. The authentication server according to claim 7, wherein the authentication server is further caused to:
determine, based on the identifier of the terminal, that the address of the first authentication server is stored.

11. The authentication server according to claim 7, wherein the authentication server is a first authentication server and the first authentication server is further caused to:
determine, based on the identifier of the terminal, that an address of a second authentication server is stored, wherein the registration failure indication comprises the address of the second authentication server, and the address of the second authentication server instructs the terminal to redirect to the second authentication server; and
send an access failure indication to the terminal based on the registration failure indication.

12. The authentication server according to claim 7, wherein the computer-executable instructions instruct the first authentication server to:
determine that fast re-authentication is not allowed; and
request the terminal to implement secure access of the terminal based on the full EAP authentication procedure.

13. A secure access system, comprising:
an authentication server; and
a home subscriber server,
wherein the authentication server comprises a processor and a memory having instructions stored thereon that, when executed by the processor, cause the authentication server to:
receive a first message from a non-3rd generation partnership project (non-3GPP) access device having connectivity to an access network and the authentication server, wherein the first message carries a fast re-authentication identifier of a terminal attempting to re-access a core network by way of the non-3GPP access device, wherein the terminal previously accessed the core network by way of a secure access using a full extensible authentication protocol (EAP) authentication procedure, and the terminal deregistered from the core network after the secure access of the core network using the full EAP authentication procedure prior to attempting to re-access the core network;
determine that fast re-authentication is allowed based on information included in the first message indicating whether the access network is trustworthy;
perform fast re-authentication with the terminal to implement a current secure access by the terminal; and
send a second message to the home subscriber server, wherein the second message carries a registration type identifier, an identifier of the terminal, and an address of the authentication server, and the registration type identifier is used to indicate that current secure access of the terminal is secure access using a fast re-authentication procedure; and
the home subscriber server is configured to:
receive the second message; and
send a registration success indication to the authentication server,
wherein the authentication server is configured to receive the registration success indication and send an access success indication to the terminal based on the registration success indication.

14. The secure access system according to claim 13, wherein
the secure access system further comprises the non-3GPP access device,
the non-3GPP access device is configured to send an access network type or an access network identity to the authentication server, and
the first authentication server is further configured to:
receive the access network type or the access network identity from the non-3GPP access device; and
determine that fast re-authentication is allowed based on the information indicating whether the access network is trustworthy and preconfigured information indicating whether the home subscriber server supports fast re-authentication.

15. The secure access system according to claim 13, the home subscriber server, configured to determine, based on the identifier of the terminal, that the address of the authentication server is not stored.

16. The secure access system according to claim 13, wherein the home subscriber server is configured to determine, based on the identifier of the terminal, that the address of the authentication server is stored.

17. The secure access system according to claim 13, wherein
the authentication server is a first authentication server, the home subscriber server is further configured to:
determine, based on the identifier of the terminal, that an address of a second authentication server is stored; and
send a registration failure indication to the first authentication server, wherein the registration failure indication comprises the address of the second authentication server, and the address of the second authentication server instructs the terminal to redirect to the second authentication server, and
the first authentication server is configured to:
receive the registration failure indication; and
send an access failure indication to the terminal based on the registration failure indication.

18. The secure access system according to claim 13, wherein the authentication server is configured to:
determine that fast re-authentication is not allowed; and
request the terminal to implement secure access of the terminal based on the full EAP authentication procedure.

19. The method according to claim 1, wherein the information indicating whether the access network is trustworthy is based on an access network type or an access network identity.

20. The authentication server according to claim 7, wherein the information indicating whether the access network is trustworthy is based on an access network type or an access network identity.

* * * * *